Jan. 14, 1964     F. N. ZIMMERMANN     3,117,526
PORTABLE ELECTRIC IMMERSION LIQUID PUMP
Filed Nov. 21, 1962     3 Sheets-Sheet 1

INVENTOR.

FREDERICK N. ZIMMERMANN.

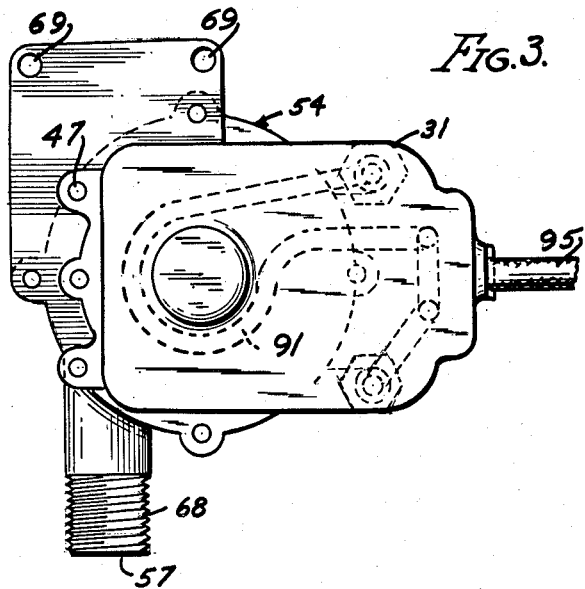
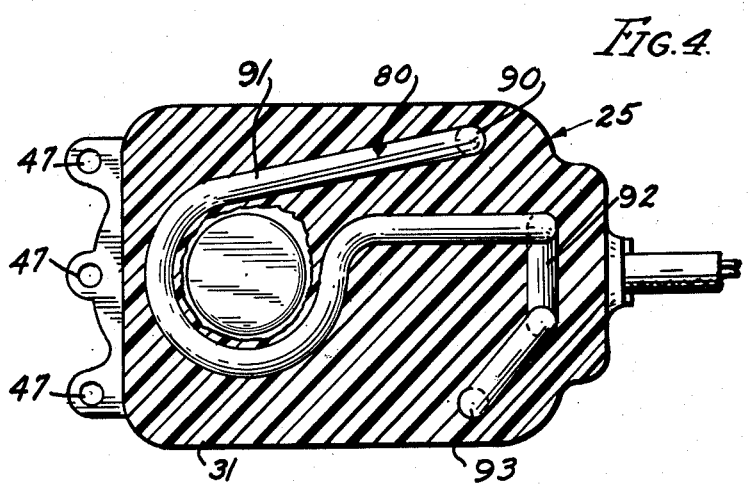
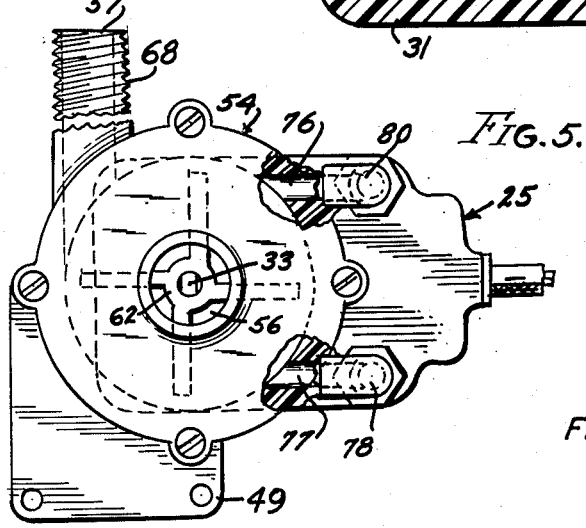

Jan. 14, 1964  F. N. ZIMMERMANN  3,117,526
PORTABLE ELECTRIC IMMERSION LIQUID PUMP
Filed Nov. 21, 1962  3 Sheets-Sheet 3
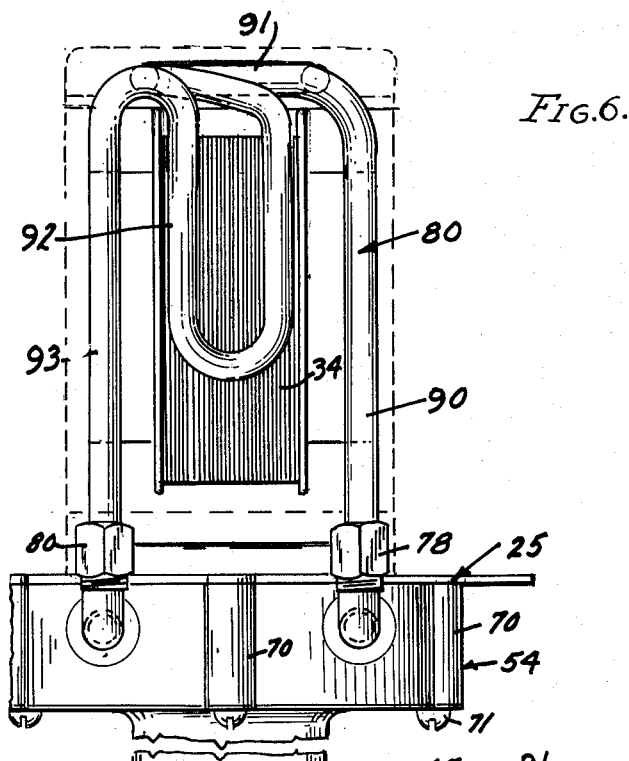
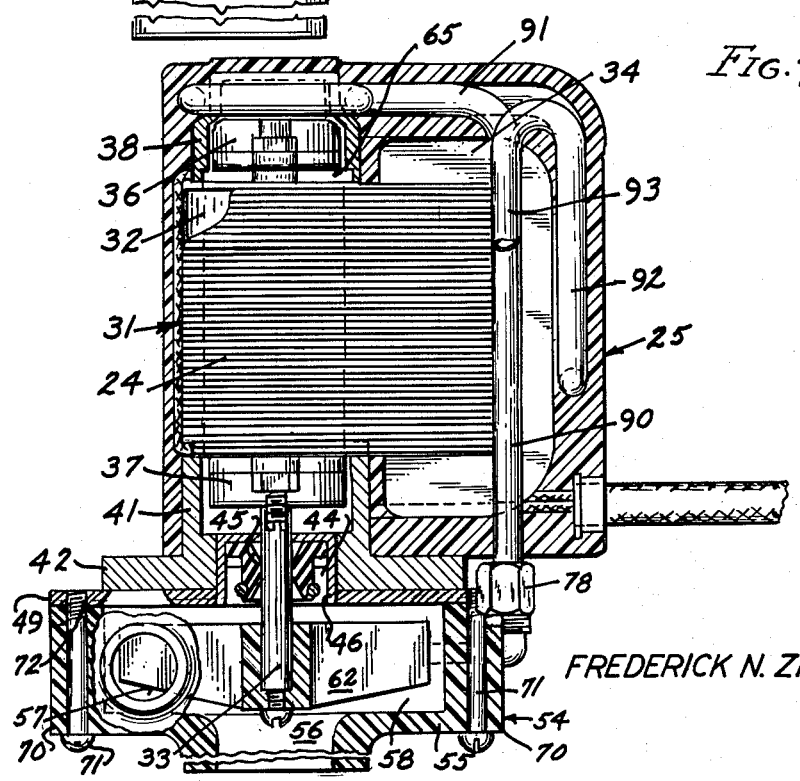
INVENTOR.
FREDERICK N. ZIMMERMANN.

United States Patent Office 3,117,526
Patented Jan. 14, 1964

3,117,526
PORTABLE ELECTRIC IMMERSION LIQUID PUMP
Frederick N. Zimmermann, Deerfield, Ill., assignor to March Manufacturing Co., Skokie, Ill., a corporation of Illinois
Filed Nov. 21, 1962, Ser. No. 239,284
3 Claims. (Cl. 103—87)

This invention relates to certain new and useful improvements in submersible motor driven pumps.

An object of the invention is to provide an electric, submersible, portable liquid pump, specifically including a liquid-tight resin sheathed submersible electric motor.

Another object is to provide a motor driven pump suitable for pumping liquids in which the unit is immersed, or partially immersed.

A further object is to provide a motor driven pump suitable for pumping liquids in which the pump impeller housing is immersed at all times, while the motor assembly is suitable to operate immersed in the liquid at certain periods and exposed to the air at other periods.

A still further object is to provide means to cool the motor and the resin sheathed coating applied to the exterior of the motor by inducing liquid at pump pressure through a serpentine type copper cooling coil embedded within the resin sheathed coating to materially increase the heat transfer surface of the motor when the motor is exposed to air and not immersed in the liquid surrounding the impeller housing of the pump unit.

Submersible electric liquid pumps usually are partially, or entirely exposed to the liquid being pumped and therefore protection of the pumps, the heat transfer surface of the motor, and in particular the electrical connections to the pump from the moisture and corrosive effects of such liquids presents a serious problem in the maintenance of such pumps, said undesirable effects causing the pumps to operate at unusually high temperatures.

Therefore, it is another object to provide an electric liquid pump wherein the laminated iron field, the field coil, the bearing cap shields and associated parts are completely encapsulated in a resin sheath, and the resin sheath having serpentine type coil means embedded therein to transfer the heat generated within the motor to the exterior, thus adapting it to situations where the surrounding liquid being pumped thereby changes its level, at one time covering the motor and cooling its surface and later having only the pump chamber in liquid and leaving the motor exposed to the atmosphere, the air normally allowing the motor to become excessively hot, but here the liquid carrying coils within the resin sheath will increase the heat transfer means and keep the motor cool while exposed to air during operation.

A still further object is to provide resin means which can be applied in liquid form to encapsulate the pump motor and electrical connections, allowed to harden at room temperature, and provide the necessary sheath to protect the parts and assist in the dissipation of heat.

A still further object is to provide a liquid pump with an electric motor, the motor having assembled therewith a pair of bearing caps arranged in vertical alignment and with cap shields arranged thereover for preventing the liquid being pumped from seeping into a compartment formed around the motor rotor normally suitable to retain coil within the compartment, the lower cap shield having an integral flange portion for spacing the pump housing at a desired distance below the motor and allowing the pump housing to be solely supported by suitable means secured to and beneath the motor unit.

Earlier inventions embodying pump assemblies adapted to be submerged in water were constructed with oil coolant sealed chamber with the rotor therein where the oil was the sole means to transfer, or transmit the heat developed by the pump while in use in an outer shell, the shell transmitting the heat to the liquid in which the pump unit is immersed and cooled thereby. However, when all of the liquid was removed from around the motor, and the motor continued to run, the shell became very hot, the oil coolant got hot, and the motor became damaged due to excessive heat. The present invention does not embody a metal shell as described above, but has water, or liquid carrying coils embedded within a resin sheath enclosing the motor, the motor being safeguarded from excessive heat at any and all times; the resin sheath providing breathe-in means to assist the coils and increase the heat transfer to the atmosphere, or the liquid surrounding the motor.

Other objects include providing means for making an efficient, compact, longlived, rugged portable liquid pump economically and effectively.

Other objects and a fuller understanding of the invention may be had by referring to the following description taken in conjunction with the accompanying drawings in which:

FIGURE 3 is a top plan view of the pumping unit illustrated in FIG. 2;

FIGURE 4 is an enlarged, fragmentary top view of the pumping unit shown in FIG. 3, a portion of the resin sealant material broken away showing the water cooling coil encompassing the top bearing cap shield;

FIGURE 5 is a bottom plan view of the pumping unit shown in FIGURE 2 with portions broken away showing inlet and outlet channels associated with the water cooling coil;

Figure 2:
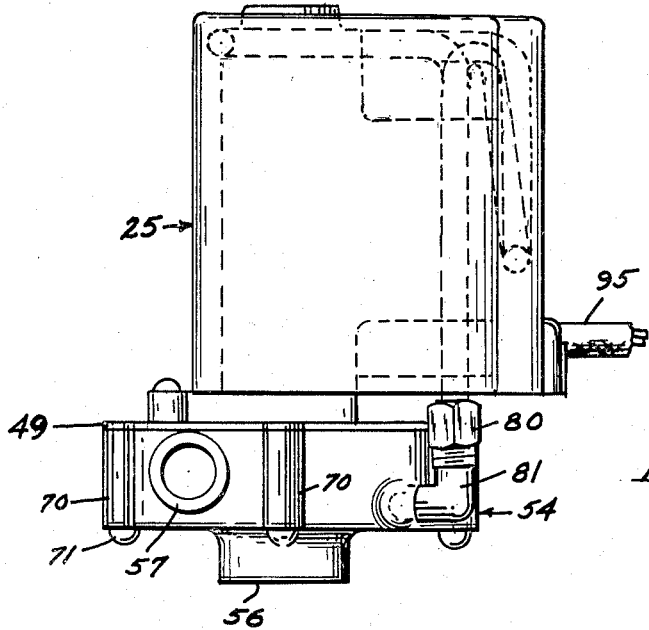
FIGURE 2 is a side elevational view of the pumping unit with the electric motor thereof totally encapsulated by resin sealant material, the water cooling coil being shown by dotted lines.

FIGURE 6 is a fragmentary end elevational view of the pumping unit shown in FIG. 2, the motor shown by dotted lines with its field coil and water cooling coil in full solid lines; and FIGURE 7 is an enlarged vertical central sectional view of the pumping unit shown in FIG. 2, having the serpentine type cooling coil extending from the pump housing and extending upwardly and around the upper bearing cap shield.

The present liquid pumping unit is adapted for use in a dry atmosphere, a humid atmosphere, more or less submerged in a liquid and/or completely submerged in the liquid being pumped thereby. As best shown in FIGURES 2, 3 and 6, the pumping unit is substantially rectangular in top plan form with a circular pump housing attached with the motor unit. However, it is to be understood that the pump may take any other suitable shape as required by its specific application.

Figure 1:
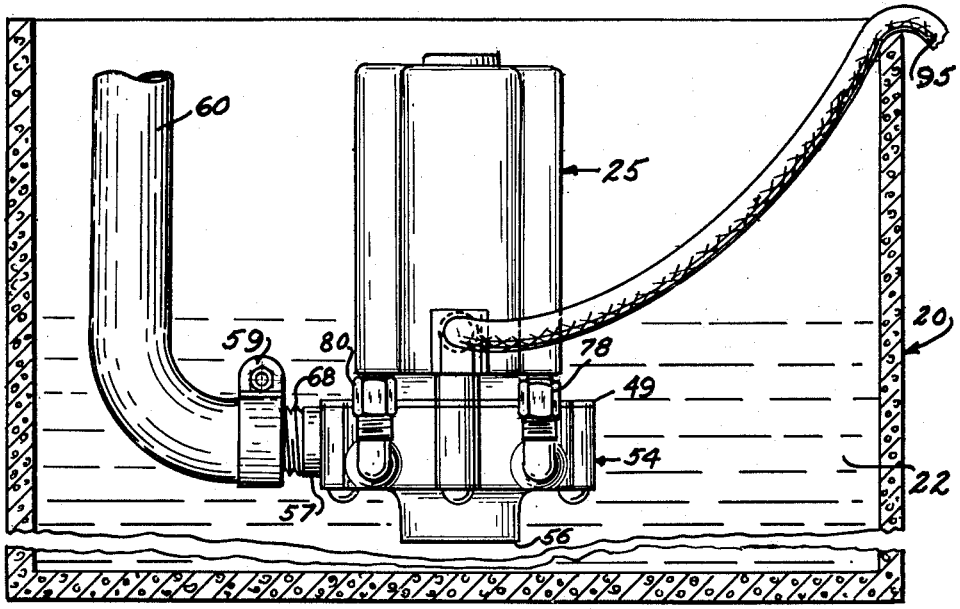
FIGURE 1 is a fragmentary view in side elevation of the pumping unit of this invention, illustrating the unit in operative relation in a reservoir, being shown in cross section, from which liquid is to be pumped and in which the unit is partially immersed.

Referring now to the drawings of the pumping unit assembly and in accordance with my invention, the reference numeral 20 designates a suitable conventionally illustrated reservoir, or the like, in which a quantity of liquid 22 is contained, said liquid to be pumped by the pumping unit which is generally indicated by the reference numeral 25. Referring to FIGURES 4 and 7 specifically, wherein details of the construction are illustrated, the pump unit 25 consists of a motor 31 and pump housing 54, said motor 31 having a rotor 32 rotatable on a vertical axis and driving a shaft 33. It will be noted that the motor 31 has a laminated iron field 24 with a field coil 34, the field coil 34 being mounted to one side of the rotor 32. By using this arrangement, it is possible to keep the field coil cooled by vertical and horizontally arranged cooling coils. The motor 31 is provided with an upper bearing cap 36 and a lower bearing cap 37, a hollow upper bearing cap shield cap 38 and a hollow lower bearing cap shield 41 having upwardly extending side and end walls and a flanged bottom extension 42, all suitably secured in vertical alignment and cooperating with drive shaft 33 and associated parts. The lower bearing cap shield 41 is provided with a counter bore and a shield forming a grommet cavity 44 to retain a grommet 45, or shaft seal therein, the grommet 45 having a venturi-shaped bore therein to receive the shaft 33 therein; the grommet 45 being enclosed within the metal shield 46 which fits tightly within said counter bore. The bearing cap shield 41 has a horizontal flange portion 42 with a plurality of protuberant parts vertically arranged about its peripheral edge portion having interior threaded bores 47 to receive threaded bolts therein. A base plate 49, with holes aligned with bores 47 is assembled below said flange 42 and in contact therewith, forming a supporting member for attaching the pump housing thereto. The pump housing 54 is constructed from any suitable material, shown here as nylon, and consists of a cup-shaped base portion with a flat base wall and an upwardly extending side wall. The side wall of the housing 54 is provided with several boss portions 70 around the circular perimeter thereof. The boss portions 70 have vertical bores extending therethrough and bolts 71 extending upwardly therethrough and are screwed into threaded openings 72 in the base plate 49. The housing 54 is provided with a central depending boss with a central liquid inlet opening 56 therein extending vertically into the pump chamber or impeller cavity 58. The side wall of the housing is provided with a laterally and outwardly tubular boss extension forming tangential outlet 57, the boss extension being provided with exterior threads 68 at its free end for the attachment of a pipe, or a hose 60 secured by a clamp 59, as shown by FIG. 1. It is seen by FIG. 3 that the base plate 49 has an enlarged portion extending outwardly from the pumping unit and is provided with a plurality of openings 69 whereby supporting bolts of any suitable kind may be used for attaching the plate to an object, thereby supporting the pumping unit as desired within a reservoir or the like.

The rotor shaft 33 becomes the driving shaft for the impeller 62 which consists of a body plate and four radial blades, the impeller 62 being secured to the lower end of shaft 33 and arranged within the impeller cavity 58. The rotation of the impeller 62 draws the liquid through the inlet 56 into the cavity 58 and forces it out through the tangential outlet pipe 57 and through the hose 60 to any desired destination. The side wall of housing 54 is provided with two channels 76 and 77 arranged parallel with each other and at ninety degrees with the outlet pipe 57, thereby forming two liquid passageways disposed tangent to the circumference of the inner wall of the cavity and extending from the impeller cavity to the exterior of the pump housing. As viewed by FIG. 5, as the impeller rotates in a clockwise direction, the impeller is forcing substantially all the liquid out the outlet pipe 57 which is drawn in through the inlet 56; however, a minor portion of the liquid is forced out the outlet passage 76, through the tube fitting 78, through a serpentine duct, or coil of tubing 80, through the tube fitting 81 and through the passageway 77 where it is again within the impeller cavity 56. The liquid passing through the serpentine coil 80 is a coolant fluid and absorbs the heat from adjacent bodies. As shown by FIGURES 3, 4, 6 and 7, the coil 80 consists of an endless piece of tubing with a vertical riser 90, a horizontal substantially U-shaped portion 91, a vertical substantially U-shaped portion 92 and a vertical return tube 93 attached to the tube fitting 81.

The space surrounding the rotor 32 and between the upper and lower bearing cap shields and inside the motor wall, will be considered the motor chamber. It is clearly seen that the rotor and the bearings may be surrounded by an oil coolant poured into the motor chamber 65 simply by momentarily removing the grommet 45 and thereafter sealing it again by replacing the grommet in cavity 44 and about shaft 33.

As shown in FIG. 7, the horizontal portion 91 of coil 80 is placed on top of the motor 31 so that it surrounds the bearing cap shield 38 and momentarily held in said position by suitable securing tape or the like. Then the motor 31 with a stator and its field coil 34, bearing caps 38 and 41, and cooling coil 80, is substantially covered with epoxy resin in fluid condition. The epoxy resin will enclose the cooling coil 80 except for the two depending free ends thereof, later assembled with the tube fittings 78 and 81 screw threaded in exterior ends of passageways 76 and 77. The epoxy resin cures itself without pressure of any kind curing the curing process and becomes completely hardened and encapsulates the entire electric motor as shown by FIG. 2. The electric lead in wire 95 extends outwardly from the epoxy resin coating and free for attachment with suitable source of electric current.

The base of the plate 49 attached to the lower surface of the lower bearing cap shield 42, is free of epoxy resin and easily assembled with the cup-shaped pump housing 54 and at the same time the free ends of cooling coil 80 are connected with tube fittings 78 and 81. Since the impeller is secured to the lower end of shaft 33, and driven thereby, the impeller is free to be removed simply by removing the pump housing 54 should the occasion arise. The epoxy resin coating covers the non-insulated parts preventing moisture and liquid from contacting vital metal and moving parts. No metal covering is required about the motor as the epoxy resin coating is a liquid protector and heat transfer agent or heat conductive medium combined. The thickness of the epoxy resin coating is clearly shown by FIG. 7 and it is well known that the resin involves the mixing of two components, a resin and a hardener. Once the components are mixed, the chemical action takes place and develops into a watertight bond with heat conductive features.

In the past, pumps to be submerged or partially submerged had the motor units enclosed in oil, the oil absorbing the heat from the motor coil and associated parts and the outer metal shell conveying the heat collected to the water in which it is submerged. However, when the water level becomes low, or the reservoir becomes substantially dry, the shell stays hot and cannot cool the oil causing overheating of the motor, damaging the gaskets and allowing water to seep into the motor cavity ruining the motor. My coated unit provides a completely sealed motor chamber with oil therein; the heat of the moving parts is conducted by the oil to the cavity walls and then to the resin coating and thereby to the liquid in which the pump is immersed. Should the water become substantially pumped out of the reservoir, the air will tend to cool the resin coating; however the cooling coil 80 extends upwardly along the field coil, over the field coil and around the upper bearing cap shield, and the cold water therein will cool the epoxy resin coating and adjacent metal parts as the coolant water is circulated through the coil. There will always be water circulating through the coil as long as there is any water within the pump impeller cavity 56.

It is important to remember that my pump can be used in any position; the location of the pump housing need be only with the liquid inlet thereof under the desired water level during use by an operator.

The water cooled epoxy resin coating surrounding the electric motor keeps the motor in running condition whether the pump unit is submerged or partially submerged. The cooling water in the cooling coil is supplied by the common impeller and to discharge the water from the reservoir. It is noted that the cooling coil is attached at its free ends to connections secured to the pump housing, but the remainder thereof is embedded and held in the epoxy resin, solely by the resin coating; no additional supports required to support the intermediate portion of the cooling coil. The cooling coil 80 is attached to fittings located at the peripheral parts or sides of the impeller cavity and is preferably tangential thereto to effectively handle a portion of the flow of water created by the rotation of the impellers. The electric motor is effectively cooled by the pumped fluid passing upwardly and around through the coil 80, the walls of the coil being in direct contact with the epoxy resin coating which is in direct contact with the motor laminations, the motor field coil and bearing cap shields.

Although I have described my invention with a certain degree of particularity, it is understood that the present disclosure has been made only by way of example, and that changes in details of construction and arrangement of parts may be resorted to without departing from the spirit and scope of the invention here presented.

I claim:

1. In a pumping unit of the type described free of protective shell members comprising a motor and a pump housing connected therewith, said pump housing having a pump cavity therein provided with a main liquid inlet in the bottom wall thereof and a main liquid outlet in the side wall thereof arranged horizontally and tangentially with the interior side wall thereof, said pumping unit adapted to be totally immersed in a supply of liquid to be pumped and having a vertical impeller shaft rotatably mounted in top and bottom bearings within said motor, said shaft having an impeller on its lower end rotatable in said pumping cavity, the said motor for driving said shaft in said top and bottom bearings, a rotor mounted on said shaft, a field arranged adjacent the side of said rotor, said bearings covered by upper and lower bearing cap shields, said pump housing embodying a top wall plate member attached to the lower bearing cap shield and supported solely thereby, an auxiliary liquid outlet channel in the side wall of said pump housing and arranged horizontally and tangentially relative to the interior side wall of the pump cavity, an auxiliary liquid inlet channel in the side wall of said pump housing and arranged horizontally and tangentially relative to the interior side wall of the pump cavity and spaced at a distance away from said auxiliary outlet, a serpentine cooling coil having two free ends and an intermediate portion, said free ends of said coil connected by suitable means with said auxiliary outlet and inlet channels, said impeller forcing liquid out through said auxiliary outlet through said coil and back into said pumping cavity, said intermediate portion of said coil arranged to encircle the top bearing area and adjacent field surfaces, and a coating of epoxy resin covering the entire intermediate portion of said coil to provide a direct conductive path for dissipation of heat collected by the coil other than that removed by the water returned to the pumping cavity and discharged through the main liquid outlet.

2. An electrically actuated liquid pump assembly comprising an electric motor unit and a liquid pump housing rigidly secured together, said motor unit having a vertical drive shaft, a rotor, a field of magnetic material, a field coil mounted at one side of said field, said rotor mounted on said vertical drive shaft and rotatable therewith, an upper bearing cap mounted upon said field and supporting the upper end portion of said drive shaft, a lower bearing cap mounted upon the lower surface of said field and supporting the lower end portion of said drive shaft, an upper bearing cap shield enclosing said upper bearing cap and secured in intimate contact with the upper surface of said field, a lower bearing cap shield enclosing said lower bearing cap, and secured in intimate contact with the lower surface of said field, a supporting plate attached solely to said lower bearing cap shield, said pump housing attached solely to said supporting plate by suitable means, said pump housing having a bottom wall with a central vertical liquid inlet opening therein and a circular vertical side wall providing an impeller cavity therein, the lower end of said drive shaft extending into said impeller cavity and arranged to rotate therein, an impeller affixed to the lower end of said drive shaft within said impeller cavity and arranged to rotate with said drive shaft, said supporting plate forming a top wall for said cvity, said impeller cavity having a main liquid outlet embodied therein and extending through said side wall of said housing and arranged tangentially relative to the interior side wall thereof, an auxiliary cooling liquid outlet channel extending horizontally and tangentially through the side wall of the cavity, an auxiliary liquid inlet channel extending horizontally and tangentially through the side wall of the cavity, said channels spaced on opposite sides of said cavity and parallel with each other, a serpentine cooling coil with two free ends and an intermediate section, one of said free ends connected by elbow means with said auxiliary outlet channel, the other of said free ends connected with elbow means assembled in said auxiliary inlet channel, whereby a quantity of cooling water in said cavity is forced through said serpentine coil by the impeller when in motion, said intermediate section of said serpentine coil arranged in juxtaposition with the exterior surfaces of said field and field coil with a horizontal U-shaped mid-portion thereof encircling the upper bearing cap shield, and a coating of epoxy resin encapsulating said motor unit and said intermediate section of said cooling coil leaving said rotor and bearing caps in an uncoated condition along with the uncoated pump housing, the cooling coil acting as a heat transfer medium for heat generated by said electric motor unit and the coating acting as a heat transfer medium from the cooling coil to the air.

3. The construction according to claim 2 wherein the intermediate section of said serpentine coil embodies a vertical U-shaped portion between the two said risers, said vertical U-shaped portion joining the said horizontal U-shaped mid-portion and forming an integral part thereof.

References Cited in the file of this patent
UNITED STATES PATENTS

| 3,041,976 | Maynard | July 3, 1962 |

FOREIGN PATENTS

| 209,606 | Great Britain | Jan. 17, 1924 |
| 618,111 | Great Britain | Feb. 16, 1949 |